Figure 1:
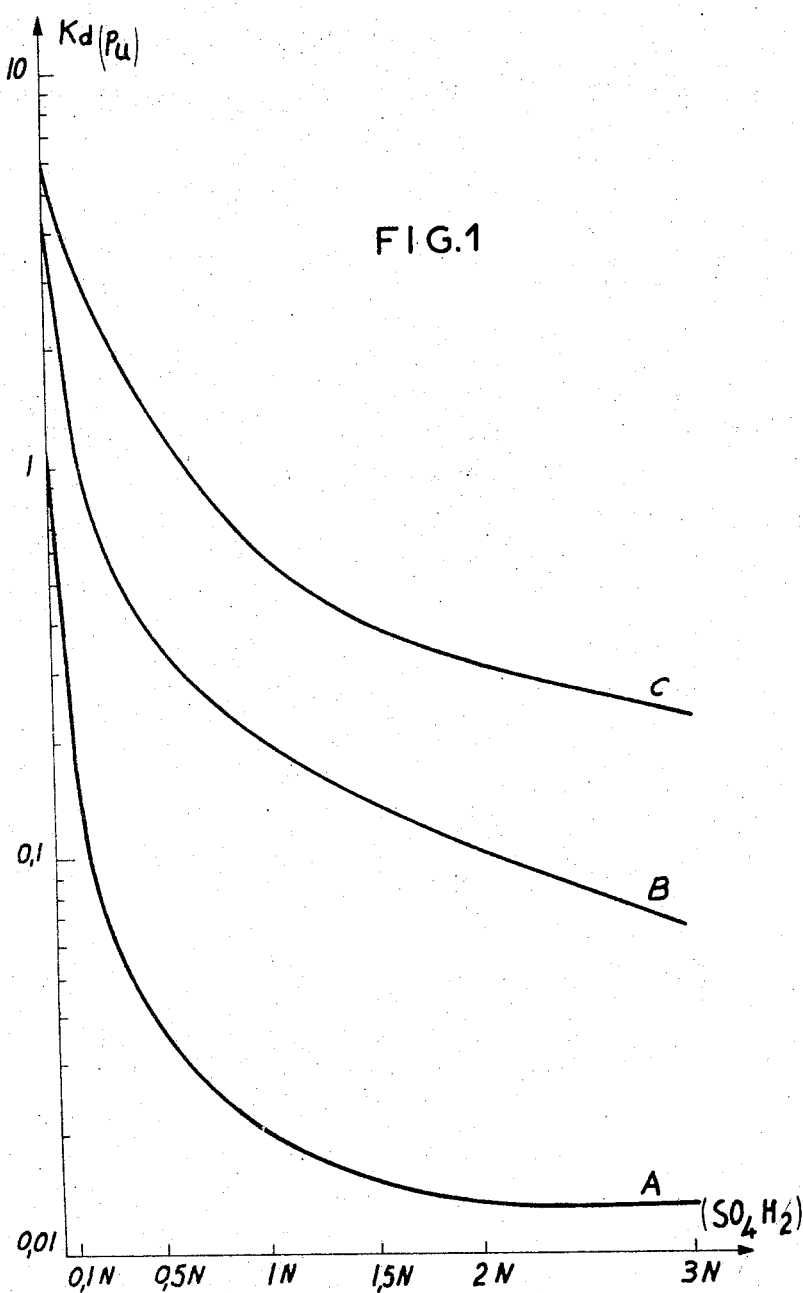

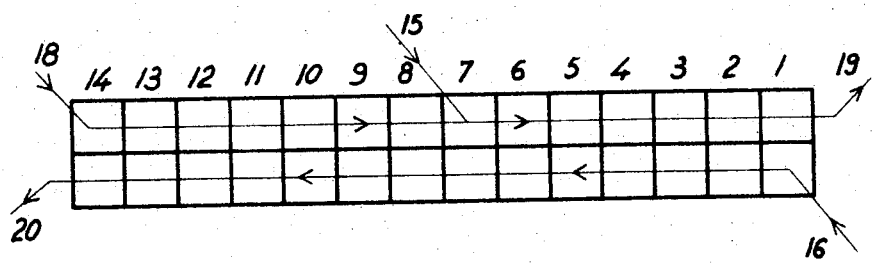
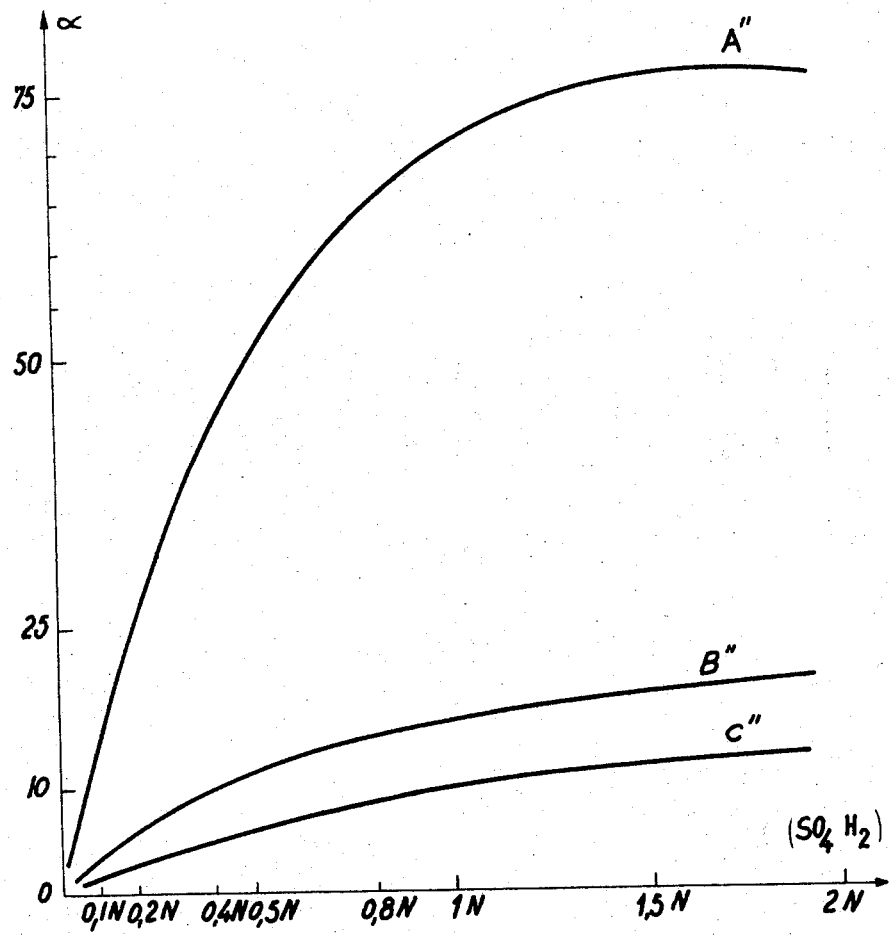
FIG.4
FIG.3

United States Patent Office 3,343,925
Patented Sept. 26, 1967

3,343,925
METHOD OF SEPARATION OF URANIUM FROM PLUTONIUM
André Bathellier, Sceaux, France, assignor to Commissariat à l'Energie Atomique, Paris, France
Filed Nov. 17, 1964, Ser. No. 411,912
Claims priority, application France, Nov. 26, 1963, 954,945
7 Claims. (Cl. 23—341)

The present invention relates to a method of separating uranium from plutonium.

Processes for the separation of plutonium from uranium and the fission products associated therewith with respect to irradiated uranium rods within a nuclear reactor are known. One such process makes use of the differences in the solubility in organic solvents such as tributyl-phosphate diluted with dodecane of the nitrates which are formed during the chemical processing of said rods.

Since the nitrates of fission products are very sparingly soluble in tributyl-phosphate, there is found to be present at a certain moment of the separation process an organic phase which essentially contains uranyl nitrate having a valency of 4. Accordingly the remainder of the process consists in recovering the plutonium as quantitatively and as selectively as possible. The presence of uranium as an impurity should be avoided since many applications call for plutonium in its purest form.

The methods of selective extraction of plutonium which are already known in the prior art make use of the reduction of plutonium from a valence of 4 to a valence of 3. An aqueous solution of a reducing agent having an oxidation-reduction potential capable of converting tetravalent plutonium to trivalent plutonium is employed. The tetravalent plutonium is contacted with agitation and in countercurrent flow with the organic solvent referred-to. Accordingly, the plutonium nitrate which has a valence of 3 and which is very sparingly soluble in tributyl-phosphate passes into the aqueous phase whereas the major part of the uranyl nitrate remains in the organic phase. A suitable washing of the aqueous phase with fresh solvent makes it possible to extract the small quantity of uranium which has passed into the aqueous solution.

The reducing agents which are usually employed for the purpose of performing this separation process are mineral reducing agents such as ferrous iron, uranous uranium or organic reducing agents such as hydrazine or hydroxylamine.

The use of mineral reducing agents has a further disadvantage in that it introduces undesirable contaminating elements in the plutonium during the purification process. For example, in the examples referred-to above, either iron or uranium is introduced as a contaminant by reason of the fact that the reducing agent is necessarily employed in excess.

With respect to the use of organic reducing agents, a disadvantage arises due to the fact that the rate of reduction of plutonium is low and increasingly so as the aqueous medium has a higher acid concentration. However, the passing of the plutonium into the aqueous phase is usually turned to profitable account for the purpose of achieving a higher concentration of plutonium by utilizing a low flow rate of aqueous phase and a relatively high flow rate of organic phase. The acid contained in the organic phase concentrates at the same time in the aqueous phase and then hinders the reduction process. If, on the other hand, it is found desirable to maintain the acid concentration of the aqueous phase in order to assist the reduction process, it is in that case necessary to increase the relative flow rate of said aqueous phase, with the result that it is no longer possible to obtain a high concentration of plutonium.

It is known to re-extract plutonium from an organic phase consisting of trilaurylamine by contacting said organic phase with an aqueous phase consisting of a mixture of sulphuric acid and nitric acid having an acid concentration higher than 0.1 N and an oxidation-reduction potential which maintains the plutonium at a valence of 4 throughout the re-extraction process. This process has been disclosed in French Patent No. 1,272,566 which was filed by the present applicant, but is only applicable if the plutonium is freed from uranium in the organic phase.

The present invention supplies a remedy to the drawbacks referred-to above, especially in that it permits the possibility of obtaining plutonium in a state of high purity and concentration.

The method of separation of uranium from plutonium in accordance with the present invention is characterized in that it consists in contacting an organic phase having a base of tributyl-phosphate and containing in solution uranyl nitrate and plutonium nitrate having a valence of 4 with a sulpho-nitric aqueous phase in such a manner as to obtain a uranium-plutonium separation factor which permits of adequate separation of the plutonium by the selective passing of the said plutonium into the aqueous phase without entailing any need to reduce it to the valence of 3.

According to the process of the invention, plutonium nitrate is transformed into plutonium sulphate which is insoluble in tributyl-phosphate. This transformation process is effected by addition of sulphate ions to the aqueous phase which is contacted with the organic phase. The sulphate ions are introduced either in the form of soluble sulphates or in the form of free sulphuric acid.

The distribution ratio $Kd$ (Pu) of plutonium is defined by the relation:

$$Kd\,(Pu) = \frac{\text{Concentration of plutonium in the organic phase}}{\text{Concentration of plutonium in the aqueous phase}}$$

The inventors of the process according to the invention have determined the curves which give the distribution ratios $Kd$ (Pu) and $Kd$ (U) of plutonium and uranium (this last-mentioned distribution ratio in respect of uranium being defined in the same manner as the first in respect of plutonium) in a sulpho-nitric medium. These curves are given respectively in FIGURES 1 and 2, in which the distribution ratios have been plotted as ordinates and the concentration of sulphate ions has been plotted as abscissae. The graduated scale is logarithmic along the axis of the ordinates and the curves A and A′ correspond to a nitric acid concentration of 1 N, the curves B and B′ correspond to a nitric acid concentration of 2 N and the curves C and C′ correspond respectively to nitric acid concentrations of 3 N and 4 N.

These curves show in particular that the distribution ratio of plutonium is much lower in a sulpho-nitric medium than in a nitric medium alone, and becomes correspondingly lower as the concentration of nitric acid is lower and the concentration of sulphate ions is higher; this property is also related to the fact that the distribution ratio of plutonium in the state of nitrate increases with the concentration of nitric acid.

Figure 2:
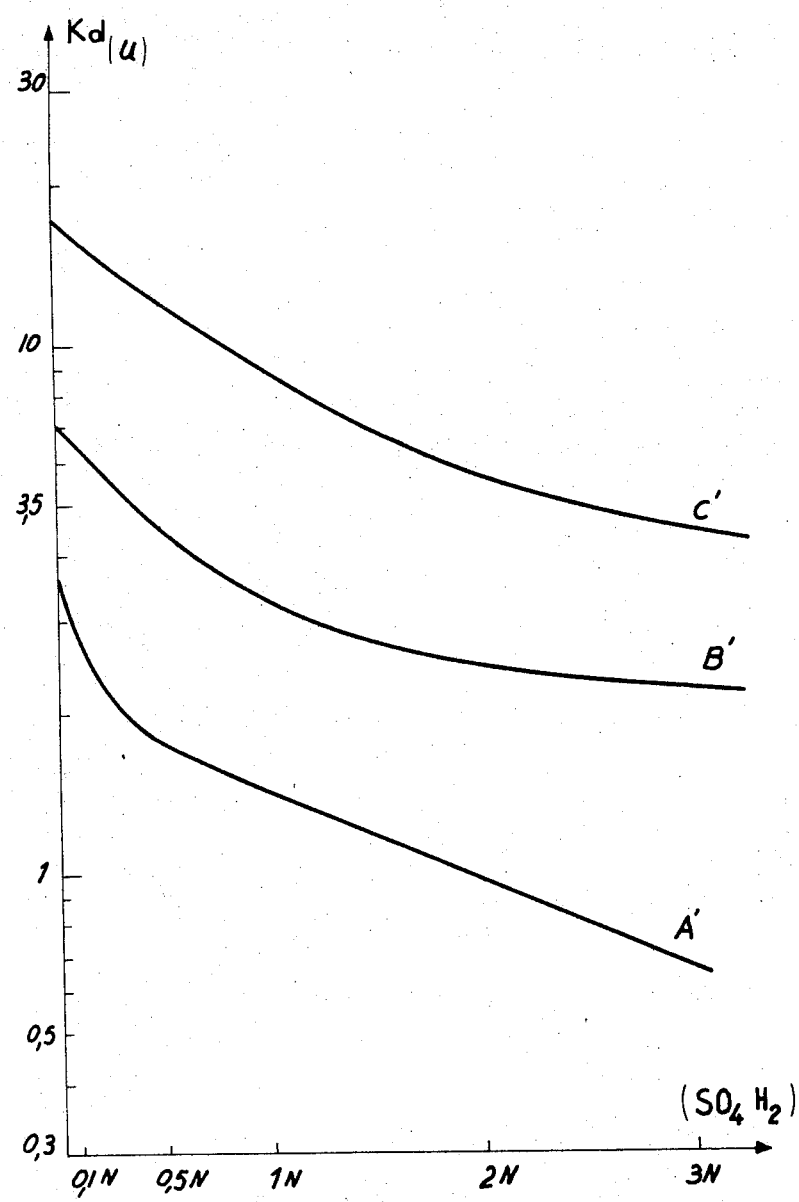

A comparison of the curves of FIG. 1 and FIG. 2 shows that the distribution ratio of uranium has decreased to a lesser extent than that of plutonium in respect of an identical addition of sulphate ions. The possibility of separation of uranium from plutonium is therefore increased as shown by the curves of FIG. 3, in which there has been plotted as ordinates the uranium-plutonium separation factor, namely α as defined by the relation:

$$\alpha = Kd\ (U)/Kd\ (Pu)$$

and, as abscissae, the concentration of sulphate ions. In this figure, the curves A″, B″ and C″ correspond respectively to concentrations of nitric acid which are equal to 1 N, 2 N and 3 N.

In accordance with the present invention, it is advisable to work with a high concentration of sulphuric acid and a low concentration of nitric acid. Taking into account on the one hand the fact that the presence of nitric acid is made necessary, at least at a low concentration, by the composition of the phase in which the plutonium and uranium are initially present and, on the other hand, the economy of reagents, there is preferably employed in accordance with the process of this invention a concentration of sulphate ions within the range of 0.1 N to 2.5 N and a concentration of nitric acid which is within the range of 0.5 N to 3.5 N.

If one value of the separation factor α is imposed for a single contacting of organic phase with aqueous phase, a number of values are possible for the concentration of nitric acid and the concentration of sulphate ions. If a small increase is made in the concentration of nitric acid, it is consequently necessary in order to retain a same value of α to increase the concentration of sulphate ions to a much greater extent.

Certain high values of the separation factor cannot in any case be obtained in a single contacting operation if the concentration of nitric acid is too high; thus, in order that the separation factor should be at least equal to 30, it is essential to ensure that the nitric acid concentration is not higher than 2 N.

Although it is possible to carry out the process even with fairly low separation factors, for example lower than 25, by repeating the enriching operation a certain number of times in a multiple-stage plant consisting of a bank of mixer-settlers placed in serial arrangement, the operation is preferably carried out with a concentration of nitric acid which is lower than 2 N and a concentration of sulphate ions which is higher than 0.4 N and which is equal to a maximum of 2 N.

It should be noted in addition that, even in the cases in which the separation factor α selected is high, it is essential in order to achieve production of plutonium which is practically free from uranium to provide a separation plant consisting of at least five stages, in view of the low value of the initial ratio Pu/U which can be comprised between 1/10 and 1/100,000.

The concentrations in the initial organic phase are preferably within the range of 0.005 g./l. to 5 g./l. in the case of plutonium and 10 g./l. to 130 g./l. in the case of uranium.

The organic phase preferably consists of dodecane containing tributyl-phosphate.

In order to remove from the sulpho-nitric aqueous phase the small quantity of uranium which was re-extracted in the course of contacting with the charged organic phase, this latter is washed with an adequate quantity of organic phase which is subsequently returned to the entering charged organic phase, mixed with this latter and circulated therewith through the re-extraction section proper of the bank of mixer-settlers.

The process according to the invention offers an advantage in that it produces a high concentration of plutonium which is not subject to contamination by another metallic ion. It is easy to appreciate the value of a process whereby the plutonium which is present in the aqueous phase can be directly precipitated with oxalic acid without requiring in future any preliminary purification of plutonium.

With reference to the diagrammatic FIGURE 4, there is described below one example which relates to the practical application of the process for the separation of uranium from plutonium in accordance with the invention. This example is given for illustration purposes and without applicant's intent to be limited thereby.

*Example 1*

For the formation of the sulpho-nitric aqueous phase, the sulphate ions are introduced solely by sulphuric acid.

The different stages of the bank of mixer-settlers which is illustrated in FIG. 4 are designated by the references 1 to 14; the stage 7 receives at 15 the charged organic phase to be processed; this phase has the following composition:

| | |
|---|---|
| Tributyl-phosphate in dodecane _____percent__ | 20 |
| Uranium _____g./l__ | 40 |
| Plutonium _____g./l__ | 2 |
| Free $HNO_3$ _____ | 0.2 N | the volume rate of flow being 100 cm.³ per hour.

The aqueous-phase extractant is introduced at 16 into stage 1 at a flow rate of 15 cm.³/hour; its composition is as follows:

| | |
|---|---|
| $HNO_3$ _____ | 1 N |
| $H_2SO_4$ _____ | 0.9 N |

The solvent employed for the purpose of washing the charged aqueous phase is fed at 18 into stage 14; said solvent also consists of 20% tributyl-phosphate in dodecane; its flow rate is equal to 30 cm.³/hour.

There are therefore seven extraction stages and seven washing stages.

The organic phase which is withdrawn at 19 from stage 1 contains uranium at a concentration of 36 g./l. and has a plutonium content of 2.2 parts per million.

The aqueous phase which is withdrawn at 20 from stage 14 contains plutonium at a concentration of 14 g./l. and has a uranium content of 47 parts per million.

The plutonium purification factor with respect to uranium is therefore of the order of $4 \times 10^5$ whilst the same plutonium has a concentration factor of 7.

What I claim is:

1. A method of separating uranium from plutonium which comprises the following steps: contacting (a) an organic phase comprised of a solution of (1) tetravalent uranium in the form of uranyl nitrate and tetravalent plutonium in the form of plutonium nitrate and (2) tributyl-phosphate diluted with a solvent with (b) a sulpho-nitric aqueous phase wherein the concentration of the sulfo ions is within the range of from 0.1 N to 2.5 N and the concentration of the nitric ions is within the range of 0.5 N to 3.5 N to thereby obtain an intimate mixture of the two phases; allowing the two phases to settle out from each other and separating the two phases.

2. A method of separation of uranium from plutonium in accordance with claim 1, wherein the concentration of the nitric ions to form the aqueous phase is lower than 2 N and the concentration of the sulphate ions is higher than 0.4 N and not more than 2 N.

3. A method according to claim 1 wherein the organic phase is comprised of the following: 20% tributyl-phosphate-dodecane, 40 g./l. uranium, 2 g./l. plutonium and 0.2 N free $HNO_3$ and the aqueous phase is comprised of 1 N $HNO_3$ and 0.9 N $H_2SO_4$.

4. A method of separation of uranium from plutonium in accordance with claim 1, wherein the source of the sulphate ions in the aqueous phase is sulphuric acid.

5. A method of separation of uranium from plutonium in accordance with claim 1, wherein the source of the sulphate ions in the aqueous phase is sulphate salts 6. A method of separation of uranium from plutonium in accordance with claim 1, wherein the initial concentration of plutonium in the organic phase is within the range of 0.005 g./l. to 5 g./l. and the initial concentration of uranium in the organic phase is within the range of 10 g./l. to 130 g./l.

7. A method of separation of uranium from plutonium in accordance with claim 1, wherein the sulpho-nitric aqueous phase is subjected after contacting with the organic phase to washing with a fresh quantity of uncharged organic phase for the purpose of removing from said aqueous phase the small quantity of uranium which has been re-extracted during said contacting process, the washing organic phase being then returned to the charged organic phase.

References Cited

UNITED STATES PATENTS

| | | | |
|---|---|---|---|
| 2,924,506 | 2/1960 | Anderson et al. | 23—341 X |
| 2,990,242 | 6/1961 | Seaborg | 23—341 X |

CARL D. QUARFORTH, *Primary Examiner.*

L. DEWAYNE RUTLEDGE, *Examiner.*

S. TRAUB, R. L. GRUDZIECKI, *Assistant Examiners.*